United States Patent
Yang et al.

(10) Patent No.: US 9,549,294 B2
(45) Date of Patent: Jan. 17, 2017

(54) METHOD, SYSTEM AND APPARATUS FOR NOTIFYING NETWORK STANDARD TIME INFORMATION

(75) Inventors: Xiaodong Yang, Bejing (CN); Haiyang Quan, Beijing (CN)

(73) Assignee: China Academy of Telecommunications Technology, Beijing (CN)

(*) Notice: Subject to any disclaimer, the term of this patent is extended or adjusted under 35 U.S.C. 154(b) by 635 days.

(21) Appl. No.: 13/140,738

(22) PCT Filed: Dec. 21, 2009

(86) PCT No.: PCT/CN2009/001512
§ 371 (c)(1),
(2), (4) Date: Jun. 17, 2011

(87) PCT Pub. No.: WO2010/069155
PCT Pub. Date: Jun. 24, 2010

(65) Prior Publication Data
US 2011/0292860 A1 Dec. 1, 2011

(30) Foreign Application Priority Data
Dec. 18, 2008 (CN) .......................... 2008 1 0240165

(51) Int. Cl.
*H04W 4/06* (2009.01)
*H04W 48/12* (2009.01)

(52) U.S. Cl.
CPC ............... *H04W 4/06* (2013.01); *H04W 48/12* (2013.01)

(58) Field of Classification Search
CPC ...... H04W 48/12; H04W 4/06; H04W 72/005; H04L 12/189
(Continued)

(56) References Cited

U.S. PATENT DOCUMENTS

2009/0323574 A1* 12/2009 Koskinen et al. ............ 370/312
2011/0085488 A1* 4/2011 Widegren

FOREIGN PATENT DOCUMENTS

CN 1968078 * 5/2007
CN 1968078 A 5/2007
(Continued)

OTHER PUBLICATIONS

International Search Report for PCT/CN2009/001512 dated Apr. 1, 2010.

*Primary Examiner* — Khaled Kassim
(74) *Attorney, Agent, or Firm* — Sutherland Asbill & Brennan LLP

(57) ABSTRACT

A method, system and apparatus for notifying the Network Standard Time Information are provided by the present invention. The present invention is used to notify the Network Standard Time Information to a User Equipment (UE) in the Multimedia Broadcast Multicast Service (MBMS) mechanism, thus ensuring that the local time of the UE is consistent with the Network Standard Time Information of the network side, and enabling the UE to achieve the MBMS at a prescribed time. The said method comprises the following steps: the network side adds the Network Standard Time Information into the MBMS point-to-multipoint Control CHannel (MCCH) message; the network side notifies the Network Standard Time Information to the UE by transmitting the said MCCH message to the UE.

13 Claims, 2 Drawing Sheets

(58) Field of Classification Search
USPC .......................................................... 370/312
See application file for complete search history.

(56) References Cited

FOREIGN PATENT DOCUMENTS

| | | |
|---|---|---|
| CN | 101257649 A | 9/2008 |
| CN | 101262626 A | 9/2008 |
| CN | 101442799 A | 5/2009 |
| WO | 2008022915 A1 | 2/2008 |

* cited by examiner

METHOD, SYSTEM AND APPARATUS FOR NOTIFYING NETWORK STANDARD TIME INFORMATION

CROSS-REFERENCE TO RELATED APPLICATIONS

The present application is a US National Stage of International Application No. PCT/CN2009/001512, filed 21 Dec. 2009, designating the United States, and claiming priority to Chinese Patent Application No. 200810240165.0 filed 18 Dec. 2008.

FIELD OF THE INVENTION

The present invention relates to the field of communications and particularly to a method, system and apparatus for notifying network standard time information.

BACKGROUND OF THE INVENTION

In a Long Term Evolution (LTE) system, downlink communication services may be divided into two categories, i.e., a unicast service and a Multimedia Broadcast Multicast Service (MBMS), where the former refers to a point-to-point service of transmitting data from a data source to a User Equipment (UE) and the latter refers to a point-to-multipoint service of transmitting data from a data source to a plurality of user equipment.

In a radio access network, multicast and broadcast of both an all-text message at a low rate and a multimedia service at a high rate may be implemented in an MBMS by using a common transport channel and a common radio bearer.

However, an existing MBMS broadcast in a mobile cellular network has no possibility of notifying system time to a UE. An MBMS control channel generally is an MBMS multipoint Control CHannel (MCCH), and an MCCH message includes the following information:

1. MBMS access information;
2. MBMS common point-to-multipoint (p-t-m) radio bearer information;
3. MBMS current cell point-to-multipoint (p-t-m) radio bearer information;
4. MBMS general information;
5. MBMS modified services information;
6. MBMS neighboring cell point-to-multipoint (p-t-m) radio bearer information; and
7. MBMS unmodified services information.

Particularly, the MBMS access information is responsible for passing a parameter of an MBMS counting process, and since no counting process is configured in an operation of an MBMS Single Frequency Network (MBSFN), a UE may not fetch this parameter; the MBMS common point-to-multipoint (p-t-m) radio bearer information is responsible for configuration of the respective Radio Bearers (RBs); the MBMS current cell point-to-multipoint (p-t-m) radio bearer information is responsible for configuration of an RB of a current cell; the MBMS general information is responsible for configuration information of an MBMS Indicator CHannel (MICH) and information of some counters; the MBMS modified services information is responsible for passing information on a modified service; the MBMS neighboring cell point-to-multipoint (p-t-m) radio bearer information is responsible for passing information on an RB of a neighboring cell; and the MBMS unmodified services information is responsible for passing information on an unmodified service.

At present, a UE acquires an MBMS service in the following procedure: when a separate Secondary Common Control Physical CHannel (SCCPCH) carries merely an MBMS service, the UE fetches a System Information Block (SIB) 5 first and retrieves MBMS configuration information from the Secondary Common Control Physical CHannel (SCCPCH) system information of the MBMS, and after knowing configuration information of an MCCH of the MBMS, the UE can locate the MCCH among corresponding physical and transport channels and fetch MBMS modified services information and MBMS unmodified services information and also MBMS general information to retrieve configuration information of an MICH and possibly some information on a preferred frequency, a timer (T318), a counter and a cell group identity and also optional configuration information of an MBMS point-to-multipoint Scheduling CHannel (MSCH). If there is the MBMS service to be received by the UE, then the UE receives the corresponding MBMS service directly. If there is no MBMS service to be received by the UE, then the UE listens to the MICH.

As can be apparent, the UE fetches the SIB5first, then finds the MCCH from the SIB5 and the configuration information of the MICH from the MBMS general information in the MCCH and next listens to the MICH to determine the arrival time of the MBMS service to be received by the UE.

The UE receives the MCCH information starting from the next modification cycle notified in notification information upon determining the arrival of the MBMS service to be received by the UE. The UE knows from the MCCH whether the specific service arrives and a specific location of the arriving service and configures a corresponding bearer to receive the MBMS service starting from the next modification cycle.

However in view of the unidirectional downlink of an MBMS broadcast network, the UE cannot request a network server for system time information. No system time information of the network side is carried on the MCCH, and the time of the UE (including the time of respective applications in the UE) has to depend only upon its own setting and the UE cannot revise the local time to the time of the network side, so that the time of the UE may be inconsistent with that of the network side and consequently the UE cannot receive the MBMS service normally.

For example, a data unit (slice) of a TV program is validated at (valid from) 19:00 and invalidated at (valid to) 19:30, and a user equipment accesses a channel under the control of parameters including a start time, an end time, etc., of a distribution window of the data unit (slice) in a schedule and presents contents of a service under the control of parameters including a start time, an end time, etc., of a presentation window, but this mechanism is effected on the precondition that the time of the user equipment can be kept consistent with the system time of the network side; otherwise, the service would not be offered as expected. For example, the data unit (slice) of the program is validated at (valid from) 19:00 and invalidated at (valid to) 19:30, but there is a one-hour difference between the time locally set at the user equipment and the system time of the network side, so that the slice of the program is validated and invalidated at some unexpected time.

In view of the foregoing, the system time of the network side can not be notified to the UE in the MBMS mechanism in the prior art, thus making it impossible to ensure normal reception of an MBMS service at the UE.

SUMMARY OF THE INVENTION

Embodiments of the invention provide a method, system and apparatus for notifying network standard time information to a UE in an MBMS mechanism, thereby ensuring that the local time of the UE is kept consistent with the network standard time of the network side, so that the UE can acquire an MBMS service at a specified time.

An embodiment of the invention provides a method for notifying network standard time information, which includes:

adding, at the network side, network standard time information to a Multimedia Broadcast Multicast Service (MBMS) Multipoint Control CHannel (MCCH) message; and notifying from the network side the network standard time information to a user equipment by transmitting the MCCH message to the user equipment.

An embodiment of the invention provides a method for acquiring a Multimedia Broadcast Multicast Service (MBMS), which includes:

determining, by a user equipment, local time determined from network standard time information carried in an MBMS Multipoint Control CHannel (MCCH) message transmitted from the network side; and acquiring by the user equipment an MBMS service from the network side according to the local time.

An embodiment of the invention provides a base station including:

a system time adding unit configured to add network standard time information to a Multimedia Broadcast Multicast Service (MBMS) Multipoint Control CHannel (MCCH) message; and a transmission unit configured to transmitting the MCCH message carrying the network standard time information to a user equipment.

An embodiment of the invention provides a user equipment including:

a reception unit configured to receive a Multimedia Broadcast Multicast Service (MBMS) Multipoint Control CHannel (MCCH) message transmitted from the network side; and a system time retrieval unit configured to retrieve network standard time information from the MCCH message.

An embodiment of the invention provides a communication system including:

a base station configured to transmit a Multimedia Broadcast Multicast Service (MBMS) Multipoint Control CHannel (MCCH) message carrying network standard time information to a user equipment; and the user equipment configured to receive the MBMS Multipoint Control CHannel (MCCH) message transmitted from the base station and to retrieve the network standard time information from the message.

In the embodiments of the invention, the network standard time information is adding at the network side to the Multimedia Broadcast Multicast Service (MBMS) Multipoint Control Channel (MCCH) message; and the network standard time information is notified from the network side to the user equipment by transmitting the MCCH message to the user equipment, thereby transmitting the network standard time information to the user equipment over a broadcast network to ensure that the local time of the UE is kept consistent with the network standard time of the network side, so that the UE can acquire the MBMS service at a specified time.

DETAILED DESCRIPTION OF THE EMBODIMENTS

Embodiments of the invention provide a method, system and apparatus for notifying network standard time information to a UE in an MBMS mechanism, thereby ensuring that the local time of the UE is kept consistent with the network standard time of the network side, so that the UE can acquire an MBMS service at a specified time, where the standard time of the network side can be referred to as network standard time or system time of the network side.

It is proposed in the embodiments of the invention to add at the network side the network standard time information to an MCCH message, and specifically, as can be apparent from the analysis of the procedure in which the UE acquires the MBMS service, the UE upon being powered on generally fetches the MBMS modified services information, the MBMS unmodified services information and the MBMS general information in the MCCH message and then determines from such information whether the MBMS service will arrive, and if so, then the UE proceeds with fetching the bearer information of the MBMS service. Therefore in the embodiments of the invention, the network standard time information may be added at the network side to the MBMS modified services information, the MBMS unmodified services information or the MBMS general information.

Technical solutions according to the embodiments of the invention will be described hereinafter with reference to the drawings.

Figure 1:
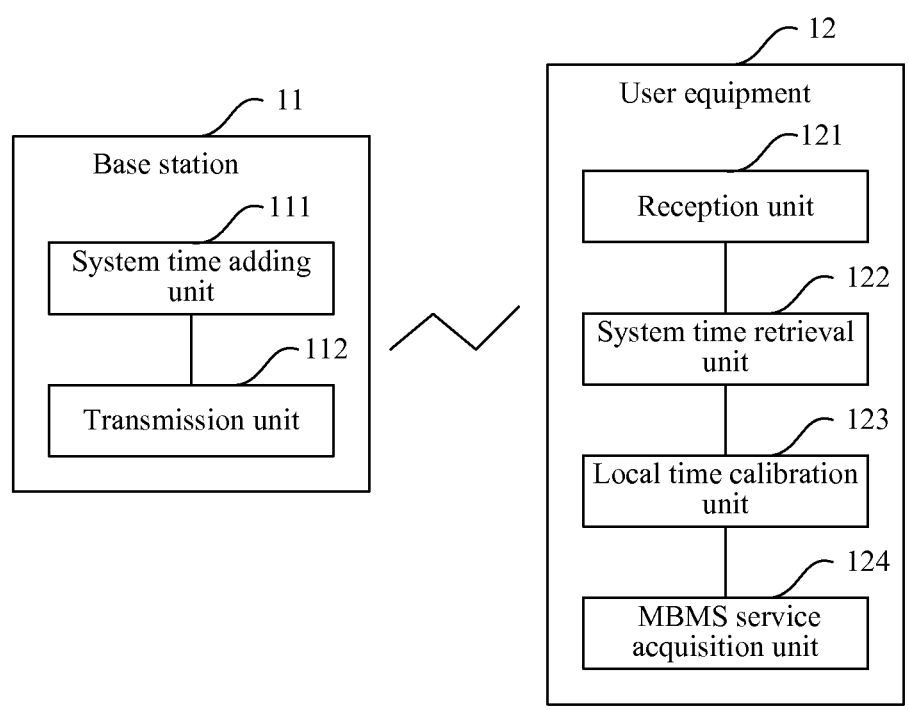
FIG. 1 is a schematic diagram of the structure of a communication system according to an embodiment of the invention.

Referring to FIG. 1, a communication system according to an embodiment of the invention includes a base station 11 and at least one user equipment 12.

The base station 11 is configured to transmit an MCCH message carrying network standard time information to the user equipment 12.

The user equipment 12 is configured to receive the MCCH message transmitted from the base station 11 and to retrieve the network standard time information therefrom.

Preferably, the base station 11 includes:

a system time adding unit 111 configured to add the network standard time information to MBMS modified services information, MBMS unmodified services information and/or MBMS general information in the MCCH message; and a transmission unit 112 configured to transmit the MCCH message carrying the network standard time information to the user equipment 12.

Preferably, the user equipment 12 includes:

a reception unit 121 configured to receive the MCCH message transmitted from the base station 11;

a system time retrieval unit 122 configured to retrieve the network standard time information from the MCCH message;

a local time calibration unit 123 configured to calibrate the local time of the user equipment 12 against the network standard time information; and an MBMS service acquisition unit 124 configured to retrieve the local time and to acquire an MBMS service from the network side according to the local time, where the local time is the time calibrated against the network standard time information.

Figure 2:
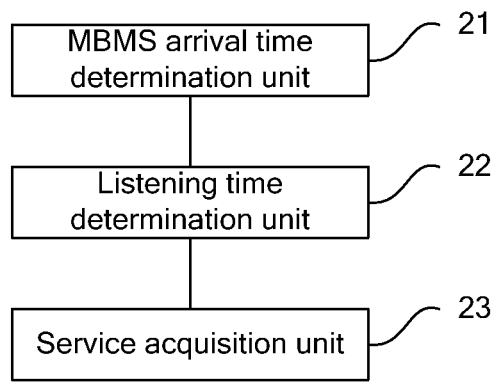
FIG. 2 is a schematic diagram of the structure of an MBMS service access unit according to an embodiment of the invention.

Preferably, referring to FIG. 2, the MBMS service acquisition unit 124 includes:

an MBMS arrival time determination unit 21 configured to determine the arrival time of the MBMS service required by a user of the user equipment;

a listening time determination unit 22 configured to determine from the arrival time of the MBMS service determined by the MBMS arrival time determination unit 21 the time to listen to an MBMS control channel (including an MICH and an MCCH); and a service acquisition unit 23 configured to check the local time in real time, to listen to the MBMS control channel when the local time comes to the time to listen to the MBMS control channel determined by the listening time determination unit 22 and to acquire the MBMS service through listening to the MBMS control channel.

For example, the UE receives the network standard time information of 2:00 p.m., and the MBMS service (e.g., news) of interest to the user arrives at 7:00 p.m., then the UE may first calibrate the local time upon reception of the network standard time information and monitor the calibrated local time in real time without listening to the MBMS control channel for that moment but will listen to the MBMS control channel when the local time comes to 6:59 p.m., that is, starting from the last minute prior to the arrival of the MBMS service, thereby acquiring the MBMS service of interest to the user through listening to the MBMS control channel.

It shall be noted that since the MBMS modified services information and the MBMS unmodified services information relate to information on a specific service, it is preferred to add the network standard time information to the MBMS general information because if the UE listening to the MCCH can retrieve the MBMS modified services information and the MBMS unmodified services information and thereby determine whether the MBMS service of interest to the user will arrive in the current modification cycle, then the UE may receive the MBMS service, without knowing the exact network standard time information, immediately after determining that the MBMS service of interest to the user will arrive in the current modification cycle.

The MBMS general information defined in an embodiment of the invention includes specific information as depicted in Table 1 below:

TABLE 1

| Information element/Group name | Needed | Type and reference | Semantics description | Release Version |
|---|---|---|---|---|
| Message type | Must be Present (MP) | Message type | | REL-6 |
| MBMS preferred frequency information | Optional (OP) | MBMS preferred frequency information 10.3.7.43a | If the cell is operating in MBSFN mode as indicated in subclause 8.1.1.6.3, the UE behavior upon reception of this Information Element, IE, is unspecified. | REL-6 |
| MBMS timers and counters | Must be Present (MP) | MBMS specific timers and counters 10.3.9a.11 | | REL-6 |
| Network Standard Time Information | Optional (OP) | Year: Month: Date: Hour: Minute: Second: Millisecond | The system may selectively transmit it, and if this information element is present, the UE may update internal timers according to the time and determine whether to receive MCCH channel. Noted that the time is the time that the system transmits the message | REL-8 |
| MICH configuration information | Must be Present (MP) | MICH configuration information 10.3.9a.14 | | REL-6 |
| Cell group identity | Must be Present (MP) | Bit string (12) | Identify the group of cells for which the same common RLC and PDCP entity is used as the current cell | REL-6 |
| Default MSCH configuration information | Optional (OP) | MSCH configuration information 10.3.9a.16 | Default MSCH configuration | REL-6 |
| Indicate changes in MBMS Selected Services | Must be Present with default values (MD) | Boolean | TRUE means that the UE indicates changes in MBMS selected services in URA_PCH, CELL_PCH or CELL_FACH. Defaulted FALSE. If the cell is operating in MBSFN mode as indicated in subclause 8.1.1.6.3, the UE behaves as if this IE has the value FALSE. | REL-6 |
| MBSFN inter-frequency neighbor list | Optional (OP) | MBSFN inter-frequency neighbor list 10.3.7.43b | May be included for FDD and 3.84/7.86 Mcps TDD if the cell is operating in MBSFN mode. | REL-7 |

Particularly, the "Network Standard Time Information" depicted in Table 1 above refers to the network standard time information, "MP" represents "Required," and "OP" represents "Optional," that is, the "Network Standard Time Information" in the table is optional and the network standard time information may not necessarily be carried. "REL-6" and "REL-8" represent Release version 6 and Release version 8 respectively.

It shall be noted that if the network standard time information carried in the MBMS general information is precise in seconds, then it may be the time that the MBMS general information is transmitted from the network side via an air interface, and if it is precise in milliseconds, then it may be the time as presumed at the network side that the UE receives the MBMS general information.

The network standard time information is added to the MBMS general information transmitted to the UE so that the UE can know from the information the network standard time information. Thus the UE receives the network standard time information upon power-on and thereby determines how soon a service which it subscribes will arrive and hence determines whether to listen to the MBMS control channel. Further it can set a period of time by which to listen to the MBMS control channel ahead of time.

Furthermore, the network standard time information transmitted from the network side to the UE in an embodiment of the invention may be absolute time or relative time. When the same absolute time is maintained at the network side and the UE, the relative time can be transmitted from the network side to the UE to thereby reduce the amount of transmitted data. The UE can derive the network standard time information from the maintained absolute time.

Contents of the elements in the network standard time information included in Table 1 above are as depicted in Table 2 below:

TABLE 2

| Network Standard Time Information | Optional (OP) | Relative time | The system may selectively transmit it, and if this information element is present, the UE may update internal timers according to the time and determine whether to receive the MCCH channel. Noted that the time may be the time that the system transmits the MCCH message | REL-8 |
|---|---|---|---|---|

For example, the same absolute time is maintained in 10 ms at the network side and the UE by being represented with 64 bits among which a System Frame Number (SFN) consists of the last 12 bits (i.e., lower 12 bits), and then relative time can be transmitted simply by transmitting the 52 bits (upper 52 bits) preceding the 12 bits, and upon reception of the 52-bit relative time, the UE can derive the absolute time of the system by adding the 12-bit SFN to the relative time carried in the 52-bit information element. For example, the SFN is 1111 1111 1111 representing 4095× 10=40950 ms. If the preceding 52 bits are 00 . . . 001, then the absolute time is 1 1111 1111 1111, i.e., 81910 ms. If GPS time is in use, then 81910 ms mean elapsing of 81910 ms from the initial GPS time. Since the SNF can be retrieved from the normal system broadcast, it will be sufficient to transmit the upper 52 bits of the absolute time.

Since the SFN of the system is always the same as that maintained at the UE, a 12-bit overhead can be dispensed with by transmitting the relative time of the system. If the Global Positioning System (GPS) with initial GPS time of 1980:January:$6^{th}$:00:00:00 is indicated for use as a time reference source of the UE and the network side along with the upper bits of the time information, then the relative time information of Year:Month:Date:Hour:Minute:Second can be derived from the absolute time at the UE and the network side. Of course, an alternative time reference resource, e.g., North Star, Galileo, etc., can be indicated. Initial time may vary from one time reference resource to another, but the same information of Year: Month: Date: Hour: Minute: Second shall be derived in the end.

Furthermore, since the MCCH message with the same contents shall be transmitted repeatedly in a modification cycle on the MCCH (as in the existing mechanism), the time indicated in the network standard time information carried in the MCCH message transmitted repeatedly in the same modification cycle on the MCCH is the time that the MCCH message was initially transmitted on the MCCH.

In view of the possibility that the UE may not receive the MCCH message including the network standard time information initially transmitted from the network side (where the carried network standard time information indicates the time that the MCCH message was transmitted from the network side) but may retrieve the network standard time information in a periodically retransmitted message of the MCCH message, the UE calibrates the local time against the network standard time information in this case in the following procedure.

The first operation is to compare a current SFN with a "relevant SFN" to derive the difference thereof.

Particularly, the current SFN refers to an SFN of the network standard time information currently retrieved by the UE, that is, the SFN upon transmission from the network side of a retransmitted message of the MCCH message including the network standard time information, and the relevant SFN refers to an SFN upon initial transmission from the network side of the MCCH message including the network standard time information in an MCCH modification cycle.

The second operation is to derive an accurate standard time as a result of adding the network standard time indicated in the network standard time information to the time difference derived in the first operation so that the UE maintains the standard time as the local time.

The UE calibrates the local time against the network standard time information at an interval of time which depends on the UE's own setting. The UE does not need to calibrate the local time upon each reception of the network standard time information.

Figure 3:
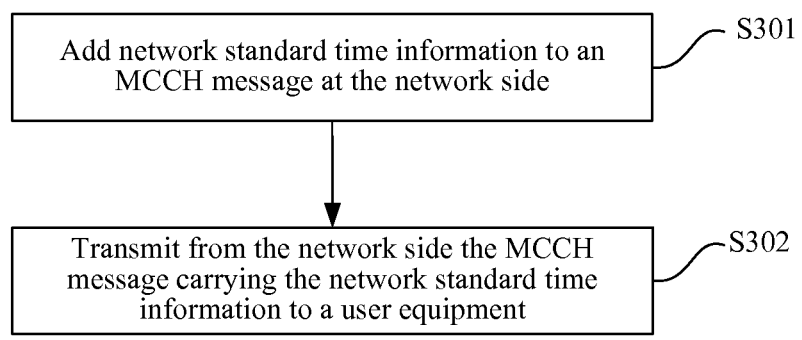
FIG. 3 is a schematic chart of a flow of a method for notifying network standard time information according to an embodiment of the invention.

In summary, referring to FIG. 3, an embodiment of the invention provides a method for notifying network standard time information, which includes:

an operation S301 of adding, at the network side, network standard time information to an MCCH message; and an operation S302 of transmitting from the network side the MCCH message carrying the network standard time information to a user equipment.

Preferably, the network standard time information is added at the network side to MBMS modified services information, MBMS unmodified services information or MBMS general information in the MCCH message. The network standard time information is absolute time or relative time.

The network standard time information is transmitted from the network side to the user equipment over a broadcast network so that the user equipment can apply the time information to a variety of local applications, which may be of great significance to a broadcast-type service.

Evidently those skilled in the art can make various modifications and variations to the invention without departing from the scope of the invention. Thus the invention is also intended to encompass these modifications and variations thereto provided the modifications and variations come into the scope of the claims appended to the invention and their equivalents.

The invention claimed is:

1. A method for notifying network standard time information, comprising:
   adding, at a network side, network standard time information to a Multimedia Broadcast Multicast Service (MBMS) Multipoint Control CHannel (MCCH) message;
   notifying, from the network side, the network standard time information to a user equipment by transmitting the MCCH message to the user equipment, so that the user equipment calibrates the local time according to the network standard time information and acquires an MBMS service according to the local time;
   wherein the user equipment acquiring the MBMS service according to the local time comprises:
   comparing, by the user equipment, a current System Frame Number (SFN) with a relevant SFN to derive a time difference thereof, wherein the current SFN refers to an SFN upon reception at the user equipment of a retransmitted message of the MCCH message comprising the network standard time information, and the relevant SFN refers to an SFN upon initial transmission from the network side of the MCCH message comprising the network standard time information in an MCCH modification cycle;
   deriving, by the user equipment, the local time by adding network standard time indicated in the network standard time information to the time difference;
   determining, by the user equipment, whether the local time coincides with a time to listen to an MBMS control channel, wherein the time to listen to an MBMS control channel is determined from an arrival time of the MBMS service; and
   listening, by the user equipment, to the MBMS control channel upon arrival of the time to listen to the MBMS control channel; and
   acquiring the MBMS service through listening to the MBMS control channel.

2. The method of claim 1, wherein the network standard time information is added at the network side to MBMS modified services information, MBMS unmodified services information and/or MBMS general information in the MCCH message.

3. The method of claim 1, wherein the network standard time information is absolute time or relative time.

4. A method for acquiring a Multimedia Broadcast Multicast Service (MBMS), comprising:
   determining, by a user equipment, local time, wherein, the local time is determined from network standard time information carried in a Multimedia Broadcast Multicast Service (MBMS) Multipoint Control CHannel (MCCH) message transmitted from a network side, wherein determining by the user equipment the local time comprises:
   comparing by the user equipment a current System Frame Number (SFN) with a relevant SFN to derive the time difference thereof, wherein the current SFN refers to an SFN upon reception at the user equipment of a retransmitted message of the MCCH message comprising the network standard time information, and the relevant SFN refers to an SFN upon initial transmission from the network side of the MCCH message comprising the network standard time information in an MCCH modification cycle; and
   deriving, by the user equipment, the local time by adding network standard time indicated in the network standard time information to the time difference; and
   acquiring, by the user equipment, an MBMS service from the network side according to the local time;
   wherein acquiring, by the user equipment, an MBMS service from the network side according to the local time comprises:
   determining, by the user equipment, whether the local time comes to time to listen to an MBMS control channel, wherein the time to listen to an MBMS control channel is determined from the arrival time of the MBMS service; and
   listening, by the user equipment, to the MBMS control channel upon arrival of the time to listen to the MBMS control channel and acquiring the MBMS service through listening to the MBMS control channel.

5. The method of claim 4, wherein the user equipment retrieves the network standard time information from MBMS modified services information, MBMS unmodified services information and/or MBMS general information in the MCCH message.

6. The method of claim 4, wherein determining by the user equipment the local time comprises:
   comparing by the user equipment, a current System Frame Number (SFN) with a relevant SFN to derive the time difference thereof, wherein the current SFN refers to an SFN upon reception at the user equipment of a retransmitted message of the MCCH message comprising the network standard time information, and the relevant SFN refers to an SFN upon initial transmission from the network side of the MCCH message comprising the network standard time information in an MCCH modification cycle; and
   deriving, by the user equipment, the local time by adding network standard time indicated in the network standard time information to the time difference.

7. An entity at a network side, comprising:
   a system time adding unit configured to add network standard time information to a Multimedia Broadcast Multicast Service (MBMS) Multipoint Control CHannel (MCCH) message; and
   a transmission unit configured to transmit the MCCH message carrying the network standard time information to a user equipment, so that the user equipment:
   calibrates a local time according to the network standard time information, wherein the local time is based at least in part on a comparison of a current System Frame Number (SFN) with a relevant SFN to derive a time difference thereof, wherein the current SFN refers to an SFN upon reception at the user equipment of a retransmitted message of the MCCH message comprising the network standard time information, and the relevant SFN refers to an SFN upon initial transmission from the network side of the MCCH message comprising the network standard time information in an MCCH modification cycle, and further based at least in part on addition of the network standard time indicated in the network standard time information to the time difference, determines whether the local time coincides with a time to listen to an MBMS control channel, wherein the time to listen to an MBMS control channel is determined from an arrival time of the MBMS service; and listens to the MBMS control channel upon arrival of the time to listen to the MBMS control channel and the user equipment acquires the MBMS service through listening to the MBMS control channel.

8. The entity of claim 7, wherein the system time adding unit adds the network standard time information to MBMS modified services information, MBMS unmodified services information and/or MBMS general information in the MCCH message.

9. A user equipment, comprising:
a reception unit configured to receive a Multimedia Broadcast Multicast Service (MBMS) Multipoint Control CHannel (MCCH) message transmitted from a network side;
a system time retrieval unit configured to retrieve network standard time information from the MCCH message;
a local time calibration unit configured to calibrate local time of the user equipment against the network standard time information, wherein the local time is based at least in part on comparing a current System Frame Number (SFN) with a relevant SFN to derive a time difference thereof, wherein the current SFN refers to an SFN upon reception at the user equipment of a retransmitted message of the MCCH message comprising the network standard time information, and the relevant SFN refers to an SFN upon initial transmission from the network side of the MCCH message comprising the network standard time information in an MCCH modification cycle, and on deriving the local time by adding network standard time indicated in the network standard time information to the time difference; and
an MBMS service acquisition unit configured to acquire an MBMS service from the network side according to the local time, wherein the local time is the time calibrated against the network standard time information;
wherein the MBMS service access unit comprises:
an MBMS arrival time determination unit configured to determine an arrival time of a user-required MBMS service;
a listening time determination unit configured to determine from the arrival time of the MBMS service the time to listen to an MBMS control channel; and
a service acquisition unit configured to check the local time to listen to the MBMS control channel when the local time coincides with the time to listen to the MBMS control channel and to acquire the MBMS service through listening to the MBMS control channel.

10. The user equipment of claim 9, wherein the system time retrieval unit retrieves the network standard time information from MBMS modified services information, MBMS unmodified services information and/or MBMS general information in the MCCH message.

11. A communication system, comprising:
an entity at a network side of the system configured to transmit a Multimedia Broadcast Multicast Service (MBMS) Multipoint Control CHannel (MCCH) message carrying network standard time information to a user equipment; and
the user equipment configured to
receive the MBMS Multipoint Control CHannel (MCCH) message transmitted from the entity,
retrieve the network standard time information from the message,
calibrate local time of the user equipment against the network standard time information, wherein the local time is based at least in part on comparing a current System Frame Number (SFN) with a relevant SFN to derive a time difference thereof, wherein the current SFN refers to an SFN upon reception at the user equipment of a retransmitted message of the MCCH message comprising the network standard time information, and the relevant SFN refers to an SFN upon initial transmission from the network side of the MCCH message comprising the network standard time information in an MCCH modification cycle, and on deriving the local time by adding network standard time indicated in the network standard time information to the time difference, and
determine whether the local time comes to time to listen to an MBMS control channel, wherein the time to listen to an MBMS control channel is determined from an arrival time of the MBMS service, and listen to the MBMS control channel upon arrival of the time to listen to the MBMS control channel and acquiring the MBMS service through listening to the MBMS control channel.

12. The system of claim 11, wherein the entity at a network side of the system comprises:
a system time adding unit configured to add the network standard time information to MBMS modified services information, MBMS unmodified services information and/or MBMS general information in the MCCH message; and
a transmission unit configured to transmit the MCCH message carrying the network standard time information to the user equipment.

13. The system of claim 11, wherein the user equipment comprises:
a reception unit configured to receive the MCCH message transmitted from the entity;
a system time retrieval unit configured to retrieve the network standard time information from the MCCH message;
a local time calibration unit configured to calibrate the local time of the user equipment against the network standard time information; and
an MBMS service acquisition unit configured to acquire an MBMS service according to the network standard time information.

* * * * *